United States Patent [19]
Zimmermann

[11] 3,932,068
[45] Jan. 13, 1976

[54] MAGNETICALLY-COUPLED PUMP

[75] Inventor: Frederick N. Zimmermann, Deerfield, Ill.

[73] Assignee: March Manufacturing Company, Glenview, Ill.

[22] Filed: July 7, 1969

[21] Appl. No.: 845,634

Related U.S. Application Data
[63] Continuation of Ser. No. 584,171, Oct. 4, 1966, abandoned.

[52] U.S. Cl................................ 417/420; 310/104
[51] Int. Cl......................... F04b 17/00; F04b 35/04
[58] Field of Search...... 103/87, 114, 87 M, 87 AG; 270/15 MC; 192/84 M; 64/28 M; 310/104; 417/420

[56] References Cited
UNITED STATES PATENTS

| | | | |
|---|---|---|---|
| 2,350,534 | 6/1944 | Rosinger | 310/104 X |
| 2,855,141 | 10/1958 | Van Rijn | 230/117 |
| 2,970,548 | 2/1961 | Berner | 103/87 |
| 3,155,045 | 11/1964 | Lown et al. | 103/114 X |
| 3,171,356 | 3/1965 | Pensabene | 103/87 |
| 3,205,827 | 9/1965 | Zimmermann | 103/87 |
| 3,249,777 | 5/1966 | Congdon et al. | 310/104 |
| 3,299,819 | 1/1967 | McCoy | 103/87 |
| 3,306,221 | 2/1967 | Goodpasture | 103/87 |
| 3,373,927 | 3/1968 | Miller | 230/15 X |

Primary Examiner—William L. Freeh
Attorney, Agent, or Firm—Callard Livingston

[57] ABSTRACT

A magnetically-coupled centrifugal type of pump characterized in that the pump housing comprises two members which can be made by molding, for example in plastic, and one of the body members has formed as integral parts thereof two reversely opening magnet wells, one for the inner driven coupling magnet and the other for the outer driving magnet; and the shaft mounting the impeller is footed on either member as an integral part of such member. Supplements to the subject: (1) the shaft may be separable and if so, has a sealing ring seated in a groove in the wall on which it is mounted or in the juxtaposed foot of the spindle; and (2) if the shaft is formed integrally, it may include a long metallic internal warp-preventing member.

13 Claims, 10 Drawing Figures

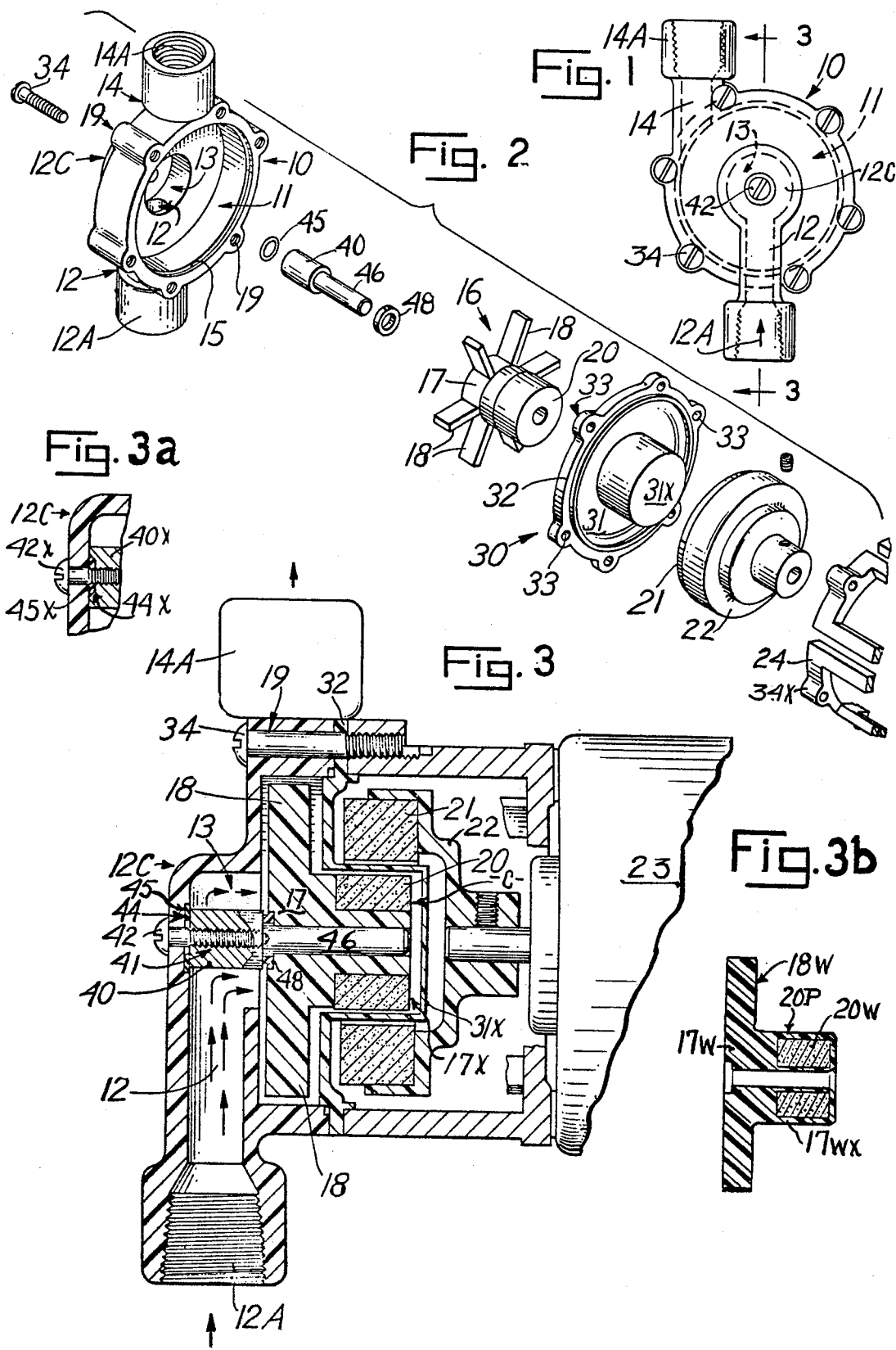

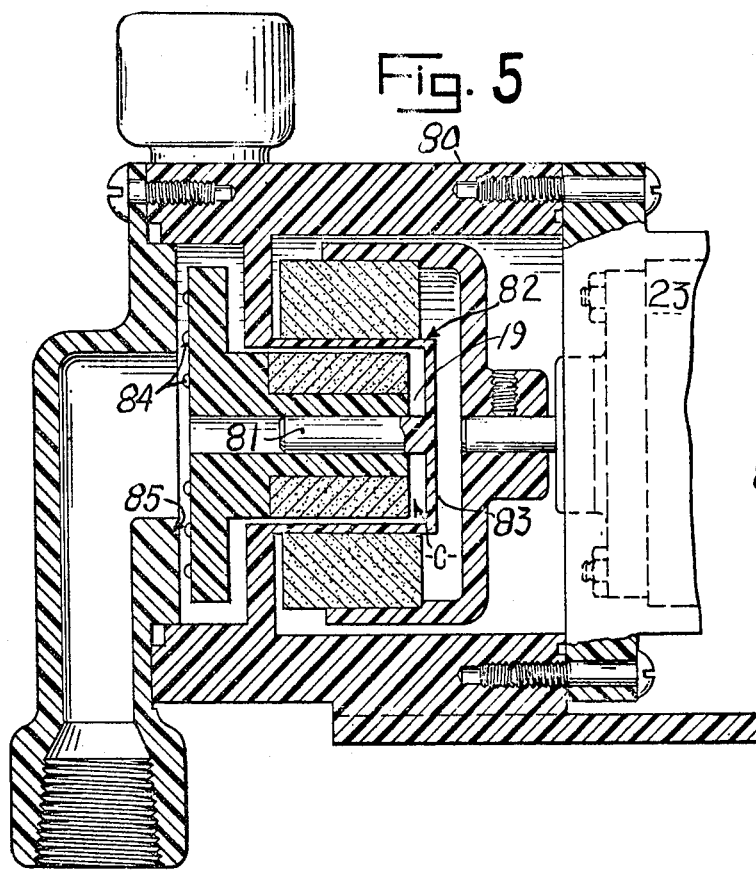
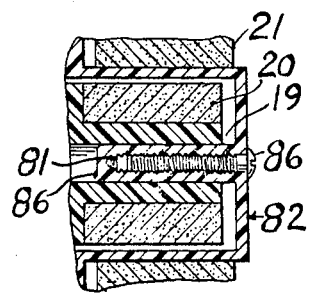
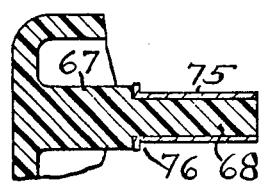
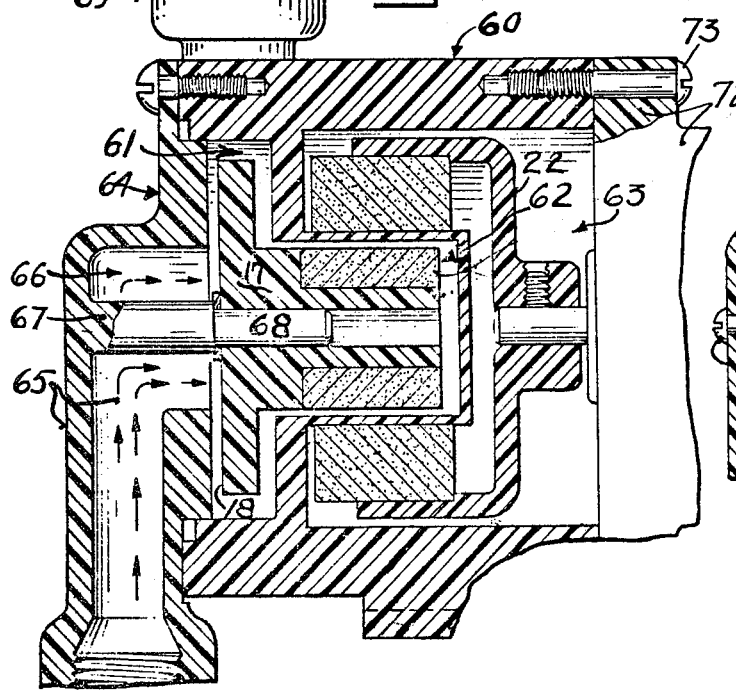
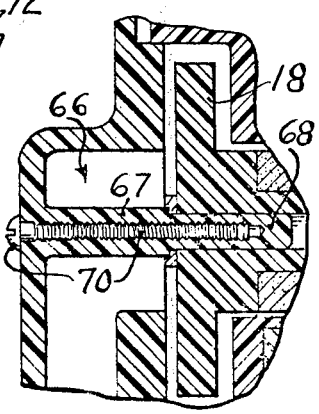

MAGNETICALLY-COUPLED PUMP

This application is a continuation of application Ser. No. 584,171 filed Oct. 4, 1966, now abandoned.

This invention pertains to magnetically-driven or coupled pumps of the type wherein a rotary impeller is journalled within a sealed pump housing to be rotated by torque derived from the shaft of an electric motor or the like which is situated outside of the pump housing.

The motor shaft does not enter the sealed pump housing or chamber but is magnetically coupled to the impeller by means of an external ring-shaped permanent magnet rotated by the motor shaft about a smaller internal ring magnet carried on the impeller hub within a magnet well which is usually sealed in assembly with the pump housing or body.

The larger external ring magnet rotates closely around the outside of the magnet well and therefore concentrically about the inner magnet sealed therein, and in this way the motor shaft is magnetically coupled to drive the impeller without the need for special bearing seals and the like for the motor shaft, which otherwise would have to enter the pump chamber in order to be connected to the impeller.

The disclosed improvements relate particularly to magnetically-coupled pumps of the type described wherein the impeller is of the centrifugal type and a cantilever or stud shaft is disposed at the blade side and end of an impeller hub remote from the opposite end and the coupling magnet thereat so as to lie in a region where stresses from the pumping load are very pronounced, whereby flaring and similar wear on the shaft bore in the impeller hub is greatly reduced;

Wherein the cantilever or stud shaft is disposed in an inlet duct terminating opposite this stressed end of the impeller so that the stud shaft is supported and largely disposed in a lowpressure zone of the entering liquid as it flows into the impeller blades;

Wherein the stud shaft, so-located, may be a separate or an integral part of the pump body or a closure member for the impeller chamber in such pump body;

Wherein a special sealing ring and seat are provided for the stud shaft in the non-integral, separate part form of the construction; and Wherein a special insert stabilizing means is provided for the form of stud shaft which is an integral part of a pump body or cover member therefor molded from non-metallic synthetic plastic materials of the class of Epoxy resins, whereby the rigidity of the stud shaft is insured against warpage due to aging and the effect of very hot liquids;

Wherein the well for the inner or driven coupling magnet may be formed as an integral part of the pump body and may further have the integral stud shaft formed as a part of such magnet well;

Wherein the impeller is molded about an annular coupling magnet.

The invention is further described in view of the annexed drawings in which:

FIG. 1 is an elevational view of one form of the pump;

FIG. 2 is an exploded perspective of the pump components, excepting the motor;

FIG. 3 is a fragmentary cross-section of the pump with a drive motor shown partially in elevation;

FIG. 3a is a sectional detail of a modified form of spindle attachment for FIG. 3;

FIG. 3b is a modified form of impeller;

FIG. 4 is a cross-section of a modified form of the pump wherein the stud shaft and the magnet well and chamber are formed as integral parts of a molded pump housing;

FIG. 4a is a fragmental sectional detail of the stabilizing means added to the integral form of the stud shaft shown in FIG. 4;

FIG. 4b is a fragmentary sectional detail of a further modification of the integral stud-shaft structure wherein a metallic bearing sleeve is provided on the spindle portion of the shaft;

FIG. 5 is a cross-section of the type of pump housing shown in FIG. 4 further modified so that the stud shaft is an integral part of the inner magnet well and the impeller is further provided with thrust limiting means in the form of bosses integrally formed on the impeller blades;

FIG. 5a is a fragmental sectional detail of the construction of FIG. 5 wherein a rigid stabilizing insert is provided in the integral stud shaft.

The embodiment of the device shown in FIGS. 1 and 2 comprises a pump body 10 having an annular pump chamber 11 recessed therein and into which inlet and outlet ducts 12 and 14 communicate, said ducts having internally threaded connecting nipples 12A and 14A, respectively, the duct 12 terminating in a central juncture 12C (FIGS. 1 and 3) with the side of the pump body 10. The pump assembly is usually mounted on a motor cage 60 by means of the screws 34 engaging in tapped holes 34X, FIG. 3, with a suitable motor 23.

As viewed in FIGS. 2 and 3, the inlet duct structure terminates in a flow well 13 opening centrally into the pump chamber 11 while the outlet or discharge duct leads outwardly from a side of the pump chamber along a line which is essentially tangential to the angular path of a rotary impeller 16, FIGS. 1, 2 and 3.

The impeller 16 is preferably molded from a suitable synthetic plastic material having good bearing qualities which is resistant to action of most corrosive liquids, and will consist in a hub portion 17 from which radiate impelling blades 18, said hub carrying at an opposite end a driven permanent magnet 20 adapted to couple magnetically with a driving permanent magnet 21 situated externally of the pump chamber in a rotary carrier 22 driven by an electric motor 23.

In the embodiment of FIG. 3, the pump chamber is sealed off by a chambered closure member 30 comprising a closure plate 31 having flange portions 32 adapted to interfit with rim portions 15 on the pump body, there being bolt holes 33 on the plate aligning with bolt holes 19 on the pump body receiving bolts 34 which clamp the body and closure plate together in assembly with a motor mounting member 24 to be described hereafter.

The closure plate 31 includes a centrally-located, outwardly projecting annular magnet chamber 31X formed as an integral part thereof and having an internal diameter affording a close clearance for the outer periphery of the inner or driven magnet 20 (FIG. 3) so that the latter may rotate freely therein but in closest possible magnetic proximity to the field from the inner periphery of the encircling outer or driving magnet 21, which is disposed to rotate about the exterior of said projecting magnet chamber structure with the inner periphery of the outer magnet 21 likewise in closest magnetic coupling proximity possible to the field of the inner magnet consistent with free rotation about the external surface of said chamber structure 31X. It will be observed that a small clearance is provided, as at —C— (in each of the constructions seen in FIGS. 3, 4, 4a, 5, 5a) permitting axial shift of the impeller responsive to the effort of the inner magnet to center itself in the field of the outer magnet against the counter effort of the rotating impeller to shift oppositely under centrifugal force when operated at high speeds.

An important feature of novelty and utility in the construction of FIG. 3 resides in the manner of supporting the impeller for rotation by means of a stud shaft or spindle structure which is secured at one of its axial ends centrally in the flow well 13 on a wall portion of the junction 13C of the inlet duct with the pump body of which it is an integral part.

As seen in FIGS. 2 and 3, the stud shaft structure comprises a foot or base portion 40 having an internally threaded bore 41 to receive a mounting and clamping screw 42 passing through the wall of the duct junction 12C in a direction into the well 13 in which said base portion is disposed in assembled condition so that it lies substantially in the terminal zone of the inflowing liquid admitted through the duct 12 where the flow changes direction toward the hub of the impeller and the root portions of the impeller blades.

The aforesaid disposition and clamping of the stud shaft is rendered leak-proof by the provision of an annular seat 44 recessed into the inner wall of junction 12C and into which seat the end of the spindle base seats against a sealing means such as a rubber or like O-ring 45 to be clamped tight by the screw 42.

The free end portion of the stud shaft projects from its base portion 40 and centrally into the magnet well 31X and is reduced in diameter to provide a spindle portion 46 upon which the impeller hub structure is rotatably carried, as in FIG. 3.

The stud spindle may be formed of a corrosion-resistant metal such as a suitable grade of stainless steel, or in certain other important embodiments to be described, said shaft is formed as an integral part of the main body structure, whether the latter is metallic or non-metallic.

As viewed in FIG. 3, the innermost extremity 17X of the impeller hub is dimensioned to afford a small clearance with the opposite inner wall surface of the magnet well or chamber 31X to permit the previously-mentioned axial shift of the impeller on the shaft permitted by the clearance at —C—; while at the opposite side of the impeller hub a simple thrust bearing or washer 48 of suitable non-ferrous material, such as "Teflon" or the like, may relieve wear at this point.

In the case where the wall thickness of the pump body, particularly at junction 12C of the inlet duct structure with the remainder of the body cannot be of suitable thickness to reliably carry the load of larger sizes of impeller, the shaft-mounting arrangement of FIG. 3a is employed, wherein the base portion 40X of the stud shaft has a recessed seat 44X formed in its end, rather than in the wall of the housing and junction 12C, the sealing washer or O-ring 45X being captured in such recessed seat, as in the embodiment of FIG. 3, by the same clamping and mounting screw means 42X.

The inner or driven magnet 20 tends to center itself in the field of the outer driving magnet 21, and this tendency is aided by rotation of the impeller up to a certain speed, the aforementioned clearance at —C— permitting freedom of movement of the hub portions 17X for this purpose.

However, the working load on the impeller in displacing liquid tends to be greatest near the tips of the blades, i.e. in the region of the blades adjacent the reference character 18 in FIG. 3, and the loading and wear on the stud shaft spindle portions 46 tends to be greatest in the region near the juncture thereof with the base portion 40, instead of at its free end.

In other arrangements wherein the stud shaft is required to be attached to the inner wall of the magnet chamber 31X, as in the type of pump body depicted in FIG. 5, the significant wear appears in the bore of the impeller at the opposite end 17X of the hub, that is to say near the magnets, because of the previously-mentioned loading of the impeller at the tips of the blades, and rocking lever action of the impeller hub results, which tends to flare the end of said bore in the impeller as at 19, FIG. 5, and creates a looseness which becomes progressively worse and objectionable in view of the very close clearance required between the inner magnet 20 and the inside annular wall of the chamber 31X.

The construction shown in FIGS. 2 and 3 eliminates wear from such causes and is rendered further desirable and feasible by reason of the mounting of the foot or base portion 40 of the stud shaft on a wall of the body 10 in a region in which the incoming liquid changes direction to flow into the low-pressure zone created by rotation of the impeller blades.

In the construction according to FIGS. 2 and 3, the motor mounting cage 24 is in the form of an open-grid metal casting which provides strength with minimized weight and minimal interference with the flow of cooling air through the motor 23 attached thereto (FIG. 3). However, many pump applications require the pump unit as well as the motor to be wholly enclosed and sometimes sealed, and for such purposes a modified type of motor cage and mounting means is provided according to the construction of FIG. 4 wherein the pump body 60 is molded from an Epoxy-type synthetic resin or like plastic material and includes a pump or impeller chamber 61 communicating with an inner magnet chamber 62 formed as an integral part of the body and projecting into a large outer magnet chamber 63 in which the motor-driven magnet carrier 22 is received and carries the outer or driving magnet 21 for coupling coaction with the inner or driven hub magnet 20 on the impeller 17, 18, substantially as in the construction of FIG. 3.

The pump chamber is closed by a cover member 64, also molded from a suitable plastic material and having formed as an integral part thereof an inlet duct 65 which terminates in a spindle chamber or cavity 66 in axial alignment with the blade-end of the hub 17.

An important feature of this embodiment provides that the stud shaft be formed as an integral part of the cover plate with its foot or base portion 67 in axial alignment with the bore in the hub and a spindle portion 68 projecting inwardly of the magnet chamber 62 toward the inner end wall of the latter.

In the construction of FIG. 4, unlike that of FIG. 3, the cover member 64 does not include as a part thereof the discharge duct 69, the latter being molded instead as a part of the body 60 in alignment with the pump or impeller chamber 61 and the construction is completed by attachment of the pump body 60 to a suitable motor unit 23 which may itself be encapsulated in a molded Epoxy resin jacket 72 attached to the pump body by screws 73.

The construction of FIG. 3 has the advantage that the stud shaft 40, 46 is removable and can be replaced in case of wear by corrosion and the like, and in addition shafts of a desired material may be selectively installed to meet particular corrosion requirements for various liquids. The form of the pump shown in FIG. 4 on the other hand eliminates the cost and assembly of an independently formed and installed stud shaft, as well as the magnet well structure 30, 31, 31X, such as required in the FIG. 3 embodiment, while affording the same advantage of having the stud shaft supported at the high-load influx end of the impeller hub close to the blades. Formation of the stud shaft 67 and magnet well or chambers 62, 63 as an integral part of the body 60 thus effects economies in both fabrication and assembly.

In those cases requiring exposure of the pump to very hot liquids which may tend to have an aging, warping or softening effect on the plastic material of which the integral stud shaft 67, 68 is molded, the modification of FIG. 4a is employed wherein the construction is otherwise identical to that of FIG. 4 and a long rigid metallic reinforcing means, such as a rod or screw 70, is extended tightly within the stud shaft through a substantial part of the length thereof.

The adaptability of the integrally-formed stud shaft formed of molded plastic material as a part of either the cover plate or magnet well structure is enlarged by the use of a metallic bearing sleeve 75 press fitted onto the spindle 68, as illustrated in FIG. 4b, this arrangement being of added advantage in the case of larger pumps operating at high impeller speeds, which have a tendency to pull the impeller toward the left in opposition to the centering pull of the magnets 20, 21 when the shaft speed rises much beyond 1,500 r.p.m. and under such conditions any balancing effect from the self-centering effort of the magnets diminishes as the shaft speed rises beyond this value for a given strength of magnet couple, so that an increase in wear on the shaft from this imbalance alone can be expected in the constructions of FIGS. 3 and in high speed operation, and the use of the metallic sleeve 75 may be advantageous in units intended for heavy-duty; also it is desirable to form said sleeve with a radial thrust flange 76 at the left-hand end of the spindle to absorb wear from such imbalance. Optionally, an extra thrust washer 48 such as shown in FIG. 3 may be used if the sleeve flange 76 is not provided.

The advantages of the integral magnet well and stud shaft construction may be utilized in the type of pump which has the stud shaft affixed to the bottom or end wall of the magnet well, as in FIG. 5, wherein there is illustrated a molded pump body 80 identical to the body described in view of FIG. 4 except that the stud shaft 81 is formed as an integral part of the magnet well 82 on the inner face of the end wall 83 thereof, the well being in turn an integral part of the pump body. As in the case of the other forms of the pump, sufficient clearance —C— is allowed for the self-centering action of the magnets in shifting the impeller hub toward the right in normal pumping operation; but in this type of construction additional means is required to limit axial shift of the impeller in the opposite direction, toward the left, and this means preferably takes the form of small rounded protuberances or bosses 84 molded on the outer edges of the impeller blades in positions in which they can ride against the confronting surfaces of the cover member, as at 85.

In the larger sizes of pump and those exposed to very hot liquids the integrally-formed stud shaft means when located on the end wall of the magnet well may be rigidified and stabilized by a long metallic insert member or screw 86 threaded into the length thereof, as depicted in FIG. 5a.

The annular permanent magnets are preferably of the molded ceramic type and can be exposed to high temperatures and some corrosive liquids; but pumps required to handle active acids, for example hot sulphuric acid, are equipped with the unitized impeller and magnet means disclosed in FIG. 3b, wherein the hub portions 17W, 17WX, impeller blades 18W, and driven magnet 20W are molded as a unitary assembly from plastic material suitable for the purpose, such as polyhylene, or polypropylene, the wall thickness in the hub portions enclosing the peripheral margins of the cylindrical magnet, as at 20P, being kept as thin as possible consistently with the requirement for strength and a wholly sealed, non-porous envelope in order to achieve the smallest air gap possible between the inner and outer magnets to assure optimum magnetic coupling efficiency.

It is to be understood that the described embodiments of the pump structure may utilize cast metallic body components or bodies molded from suitable synthetic resins, the latter being highly advantageous for reasons of economical manufacture and very satisfactory for many applications, whereas the more costly metallic construction may be mandatory if the pumps are required to withstand extremely high temperatures and certain corrosive liquids.

In general, the pump bodies and impellers may be molded from any of the injection or compression types of molding plastics, polypropylene, with or without filler material such as glass and asbestos fibres or metallic particles, being suitable for allaround usage, including applications involving elevated temperatures and exposure to most acids. Polyethylene mixed with glass fibres or similar fillers is also suitable for use with high temperatures.

I claim:

1. In a centrifugal pump of the magnetically-coupled type including a pump housing with inlet and outlet passages for an impeller having a coupling magnet rotatable therewith and adapted to be driven by an annular circumambient driving magnet disposed exteriorly of the housing, a housing structure adapted for fabrication by molding from either metallic or non-metallic moldable materials and comprising first and second body members joinable to form a closed pump housing including an impeller chamber and a magnet well opening only into said chamber and extending away therefrom in axial alignment with the axis of rotation of the impeller; impeller means having a hub portion adapted to be disposed in said well and impeller formations adapted to rotate in said chamber; a driven magnet affixed to said hub portion and rotatable therewith in the well; shaft means for the impeller means and comprising an integral projection of the material of one of said body members extending from a point of conjunction therewith a substantial distance into said impeller chamber and magnet well to support the impeller means for rotation as aforesaid.

2. The pump defined in claim 1 further characterized in that that one of the body members of which the stud shaft is an integral part also includes integral conformations defining said inlet passage.

3. The pump structure defined in claim 1 further characterized in that that one of the body members of which the stud shaft is an integral part also includes integral conformations defining said magnet well, and said stud shaft projects from the inside face of said well as an integral conformation of the material thereof.

4. The construction defined in claim 2 further characterized in that said stud shaft is stabilized by an elongated, rigid metallic member extending a substantial distance into said shaft from a point outside of said body member and the housing structure with no portion exposed to the pumped fluid within the pump housing including said inlet and outlet passages.

5. A pump construction according to claim 1 wherein said impeller means and hub portion are formed as a unitary structure of integrally molded non-metallic material with said driven magnet wholly embedded within said hub and thereby totally shielded from contact with corrosive fluids pumped relative to said inlet and outlet passages.

6. In a magnetically coupled pump of the type employing an impeller with a cylindrical driven magnet coaxially attached to a hub region thereof and adapted to be rotated by an annular driving magnet rotating circumambiently of the driven magnet, improvements comprising: a pump housing having inlet and outlet ports and formed of molded plastic material to include first and second body members, one of which has configurations defining an impeller chamber from which projects a cylindrical magnet well into which said driven magnet fits closely but freely for rotation with the impeller operatively disposed to rotate concentrically therewith in said impeller chamber, the other one of said body members constituting a closure for said chamber; and shaft means supporting said impeller and attached driven magnet for rotation as aforesaid and comprising a shaft element integrally conformed and footed at one end with one of said body members to project a substantial distance concentrically into said well, said well projecting concentrically with the impeller axis into space from said housing in a manner such that the driving magnet can rotate closely concentrically thereabout in coupling coaction with the driven magnet inside the well.

7. A pump construction according to claim 6 wherein said inlet port is formed as a part of said closure member and said shaft means projects from an inner wall portion thereof and is footed as aforesaid in a relatively low-pressure zone in alignment with the axis of rotation of the impeller and in the path of fluid flow from said port to the impeller.

8. The construction of claim 6 wherein said shaft means is integrally conjoined and footed at one end as aforesaid with an interior bottom wall portion of said well.

9. A pump construction according to claim 6 further characterized in that said shaft element includes a metallic rigidifying insert extending coaxially lengthwise therein for a substantial part of its length with no portion exposed within said impeller chamber or magnet well or other interior portion of said housing.

10. A pump construction according to claim 6 further characterized in that said impeller structure includes integrally conjoined portions of the plastic material thereof forming a protective shell about said driven magnet.

11. A pump construction according to claim 6 further characterized in that said impeller structure includes conjoined plastic portions totally enveloping all aspects of said driven magnet and sealing it against contact with pumped fluid.

12. A pump construction according to claim 6 wherein that one of the body members which has the magnet well as part thereof further includes a second well comprising a magnetic coupling housing and integrally conformed therewith and of a diameter to surround the first-mentioned magnet well concentrically in sealed relation thereto, the second well having an open end remote from the bottom of the first-mentioned magnet well with means adjacent said open end attaching the pump housing to a driving motor, the driving magnet being disposed and rotatable in the coupling housing defined by said second well in which it is supported by said motor.

13. In a centrifugal pump of the type including a housing having an impeller rotated therein by concentrically rotatable annular magnets one of which is attached to the impeller inside of the housing with the other magnet motor-rotated in circumambient coupling relation thereabout externally of the housing, the improvements which comprise: an impeller structure and included driven magnet particularly adapted for pumping caustics, acids and like chemically active fluids and comprising a unitary rigid body of molded plastic material of a type resistant to such fluids, said body including a cylindrical hub portion having impelling configurations integrally conformed therewith and located in relation to the axial ends thereof so as to leave exposed a substantial circumferential area of the outer cylindrical periphery thereof exposed for rotation in close proximity to a circumscribing enclosing wall portion of said housing, together with a cylindrical driven magnet embedded and sealed wholly within said structure with a substantial circumferential area of the outer cylindrical aspect thereof concentrically close to the peripheral margins of said exposed circumferential area of the hub whereby to permit close magnetic-coupling contiguity to the circumambiently rotated driving magnet.

* * * * *